United States Patent [19]

Angner et al.

[11] 4,145,579

[45] Mar. 20, 1979

[54] KEY TELEPHONE UNIT PROTECTIVE COUPLER

[75] Inventors: Ronald J. Angner, Freehold; Wayne J. Egan, Eatontown; Alan M. Gordon, Matawan; William A. Huryn, Bricktown, all of N.J.

[73] Assignee: Bell Telephone Laboratories, Incorporated, Murray Hill, N.J.

[21] Appl. No.: 840,593

[22] Filed: Oct. 11, 1977

[51] Int. Cl.² ............................................. H04M 1/00
[52] U.S. Cl. ..................................... 179/81 R; 179/99
[58] Field of Search ................ 179/81 R, 184, 98, 99, 179/1 PC; 361/91, 110, 111, 119

[56] References Cited

U.S. PATENT DOCUMENTS 3,925,624  12/1975  Earle ................................. 179/81 R
4,056,695  11/1977  Angner .................................. 179/99

*Primary Examiner*—Kathleen H. Claffy
*Assistant Examiner*—Joseph A. Popek
*Attorney, Agent, or Firm*—David H. Tannenbaum

[57] ABSTRACT

There is disclosed a protective coupler for use with key telephone line units (KTU) to provide isolation between the terminal equipment and the central office line. The protective coupler plugs onto the KTU option socket and establishes a dielectric barrier to protect the system from possible overvoltages, guarantees a balanced termination, and meets leakage requirements while remaining operable to pass control and voice signals between the network and station equipment. The central office side of the barrier contains a current sink for control purposes as well as a gain compensation circuit to adjust for varying distances from the central office.

5 Claims, 5 Drawing Figures

KEY TELEPHONE UNIT PROTECTIVE COUPLER

BACKGROUND OF THE INVENTION

Our invention relates to a protective coupler device for insertion between telephone station sets and the central office. Such protective couplers are used to insure that overvoltages which could occur as a result of a malfunction in the telephone station set or in the telephone connection system are not passed along the telephone lines to the central office, while maintaining signal balance, leakage requirements, and minimal insertion loss during normal operation.

The problem inherent with such devices is that they must pass voltage signals of one magnitude while blocking signals of another magnitude. One such device which only protects against hazardous voltages is disclosed in a U.S. Patent application of Gordon, Mazurek and Wright, Ser. No. 764,594, filed Feb. 1, 1977, and is used to monitor the line for overvoltage conditions. Such a device is passive and only operates when such an overvoltage voltage condition is detected. In that event the device operates to open the path between the terminal equipment and the network for the duration of the overvoltage. One drawback of devices which remain passive is that they can become defective and the connection to the central office continues to operate even though unprotected.

An alternative to passive couplers is a coupler which passes the desired control and signals through it, but yet acts as a barrier to overvoltage signals. However, a problem with barrier type couplers is that several types of signals must be passed through the barrier for control of the telephone system. In one situation dial pulses from the station must go through the barrier to the central office. In other situations the central office relies upon current drawn through the station to determine off-hook conditions. Also, since telephone stations are equipped with automatic gain compensation devices which operate based upon the voltage level obtained from the central office, any interference with such a voltage level, as occurs with a protective barrier, renders the gain compensation of the telephone station inoperative.

Another problem which must be taken into account in the design of any protective coupler is that there must be minimum insertion loss in the communication leads so as to maintain proper communication levels. In addition, leakage through the device must be minimized and the balance between the tip and ring leads must not be disturbed.

Another problem exists when it is desired to place a protective coupler in the path between a key telephone station and the central office. This problem arises because of the line circuit which is employed to control the communication connections. Such line circuits are mounted on plug-in boards and are inserted into the connection via a plug-in connector. The line circuits, known as KTUs are universal in nature and are used to control key telephone stations which are served directly by central offices and are also used to serve stations served by PBXs. In the situation of the PBX a protective coupler is not required and this it would be uneconomical to equip all KTUs with protective coupling capability. Accordingly, manufacturing, as well as operational, economies are lost when two types of KTUs must be manufactured.

Accordingly, it is an object of our invention to provide a protective coupler which acts in a positive manner to block certain voltages without interfering with the operation of the system, without requiring modifications to the existing equipment, without disturbing the balance leakage or adding intolerable insertion loss to the system.

It is another object of our invention to provide a protective coupler which provides for automatic gain compensation while also isolating the central office loop current from the telephone station.

It is still a further object of our invention to provide a protective coupler arranged for use with a key telephone line circuit in a manner which allows the line circuit to be used with both CO and PBX operation and without requiring all line circuits to have the coupler circuitry.

SUMMARY OF THE INVENTION

The foregoing problems of the prior art are overcome by an embodiment of our invention which utilizes a signal transformer to couple the central office line with the telephone station. The signal transformer is physically constructed in a manner which allows the passage of voice frequency signals while preventing the passage of ringing and power frequency signals. The transformer thus establishes a barrier having a central office side and a station side, as well as guaranteeing a continued balanced condition of the communication leads. A battery feed circuit is utilized on the station side to detect station set off-hook conditions and to provide current for operation of that set. The battery feed circuit is arranged such that a relay operates when a station is detected off-hook and a contact of the relay is used on the line side of the barrier to connect the coupler to the central office line. The relay contact is also used to provide dial pulse signals to the central office. A current sink on the protective coupler causes the central office to go into the off-hook mode.

In order to control the gain of the system the battery feed circuit is arranged to encourage the station set to provide maximum gain. Circuitry on the central office line side of the battery detects central office battery potential and, in response to high potential, (indicative of a short central office loop) acts to shunt down the signal to and from the telephone station. The protective coupler is mounted on a printed wiring board with contacts adopted to mate with the option plug of the key telephone unit thereby inserting between the central office and station tip and ring leads of the KTU. The protective coupler, due to the small physical size of the relay and signal transformer, can be mounted on a small daughter board thereby eliminating the need for two distinct key telephone units.

Accordingly, it is one feature of our invention to provide a series type protective coupler which acts to pass dial pulse and audio signals while inhibiting ringing and power frequency signals, while at the same time providing automatic gain control for central office lines.

It is a further feature of our invention to provide such a protective coupler in a manner which allows the unit to be plugged into an existing key telephone unit.

DESCRIPTION OF THE DRAWINGS

The foregoing features and objects, together with the operation and utilization of the present invention, will be more fully apparent from the following description taken in conjunction with the drawings, in which.

DETAILED DESCRIPTION

Figure 1:
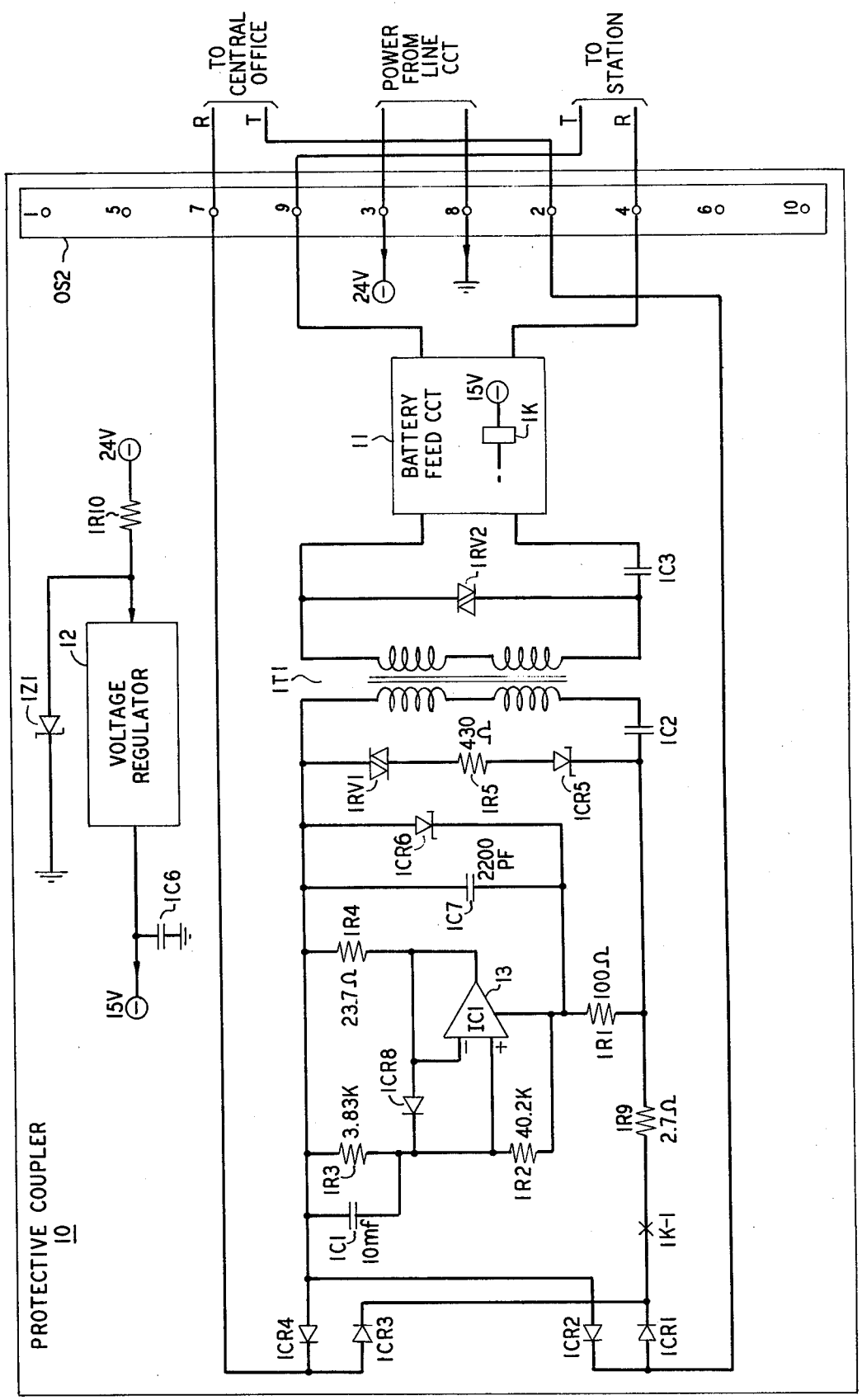
FIG. 1 shows a schematic of the protective coupler.

As shown in FIG. 1, protective coupler 10 is arranged with signal transformer 1T1 to provide isolation between the R and T leads of the central office line and the R and T leads of the associated telephone station. Signal transformer 1T1 is designed with very low mass so that it will saturate with small dc current and thus will block high current signals as well as block signals having low frequency, such as 60 Hz. Battery feed circuit 11 operates in the manner detailed in U.S. Patent application filed in the name of Embree-O'Neill Ser. No. 800,220 on May 25, 1977, which patent application is hereby incorporated by reference. As discussed in the Embree et al disclosure, when a telephone station goes off-hook, battery feed circuit 11 operates to provide voltage potential to operate the telephone station. This voltage potential is specifically designed to be at the low end of the operation range of a telephone station, thereby encouraging the telephone station to provide maximum signal output. When battery feed circuit 11 detects an off-hook condition of the associated station set, relay 1K therein operates. Relay 1K is a fast operating relay and will operate and release in conjunction with dial pulses originating at the connected station.

Turning our attention now to the line or central office side of the protective barrier, diodes 1CR1, 1CR2, 1CR3 and 1CR4 are arranged to provide bidirectional signal capability between protective coupler 10 and the central office while contact 1K-1 of relay 1K operates to connect the central office through fusible resistor 1R9 to current sink 13. Current sink 13 can be designed in any well known circuit configuration to provide dc termination similar to that of a telephone and a high ac impedance to minimize signal shunting. Fusible resistor 1R9 is 2.7 ohms and is used to open the connection to the coupler in the event of a hazardous voltage appearing on the central office line. Zener diode 1CR6 is utilized to protect the current sink from lightning and has a breakdown voltage of 30 volts.

When relay 1K operates, central office current flows via the tip and ring (T and R) leads to current sink 13 via the forward biased set of diodes (either 1CR1 and 1CR4 or 1CR2 and 1CR3) and resistors 1R9, 1R4 and 1R1. Since current sink 13 is designed to represent a telephone station, the central office switching equipment, believing a station set is attached, provides dial tone or, in the case of an incoming call, completes the connection. For outgoing calls relay 1K follows dial pulses from the connected station. These dial pulses are repeated via contact 1K-1 of the tip lead to the central office. When a communication connection is established, communication is possible from the connected station via battery feed circuit 11, capacitor 1C3, the station side of signal transformer 1T1 to the line side of signal transformer 1T1 via capacitor 1C2, resistor 1R9, enabled make contact 1K-1 and via forward biased diode set 1CR1, 1CR4 or 1CR2, 1CR3 to the central office line.

Since, as discussed above, the station circuit, as a result of low voltage provided by battery feed circuit 11, provides a signal having maximum gain, this high signal level is provided to the central office and is the level of gain which is necessary to provide communications over loops which extend up to 1300 ohms. However, on shorter loops such a gain level becomes undesirable because of the higher signal levels established by the low current to the telephone set. Thus, the gain level of the station must be reduced on short loops. As discussed above, since transformer 1T1 separates the voltage levels from the central office to the station, automatic station reduction is not possible. In order to make such a reduction automatic, zener diode 1CR5 in series combination with resistor 1R5 and varistor 1RV1 operate to reduce gain on short central office loops. This is accomplished since the dc voltage from the central office would cause zener diode 1CR5 which has a breakover voltage of 6.2 volts to conduct, thereby placing resistor 1R5 and varistor 1RV1 in shunt across the tip and ring leads to provide a signal level loss thereby reducing gain. The circuit 1RV1, 1R5 and 1CR5 is the same circuit typically found in a telephone station set for gain compensation.

Voltage regulator 12 can be arranged in any one of the well known circuit configurations to provide a stabilized 15 volts dc potential generated from ground and −24 volts which are provided via the option socket connection (OS2) to the associated line circuit.

Figure 2:
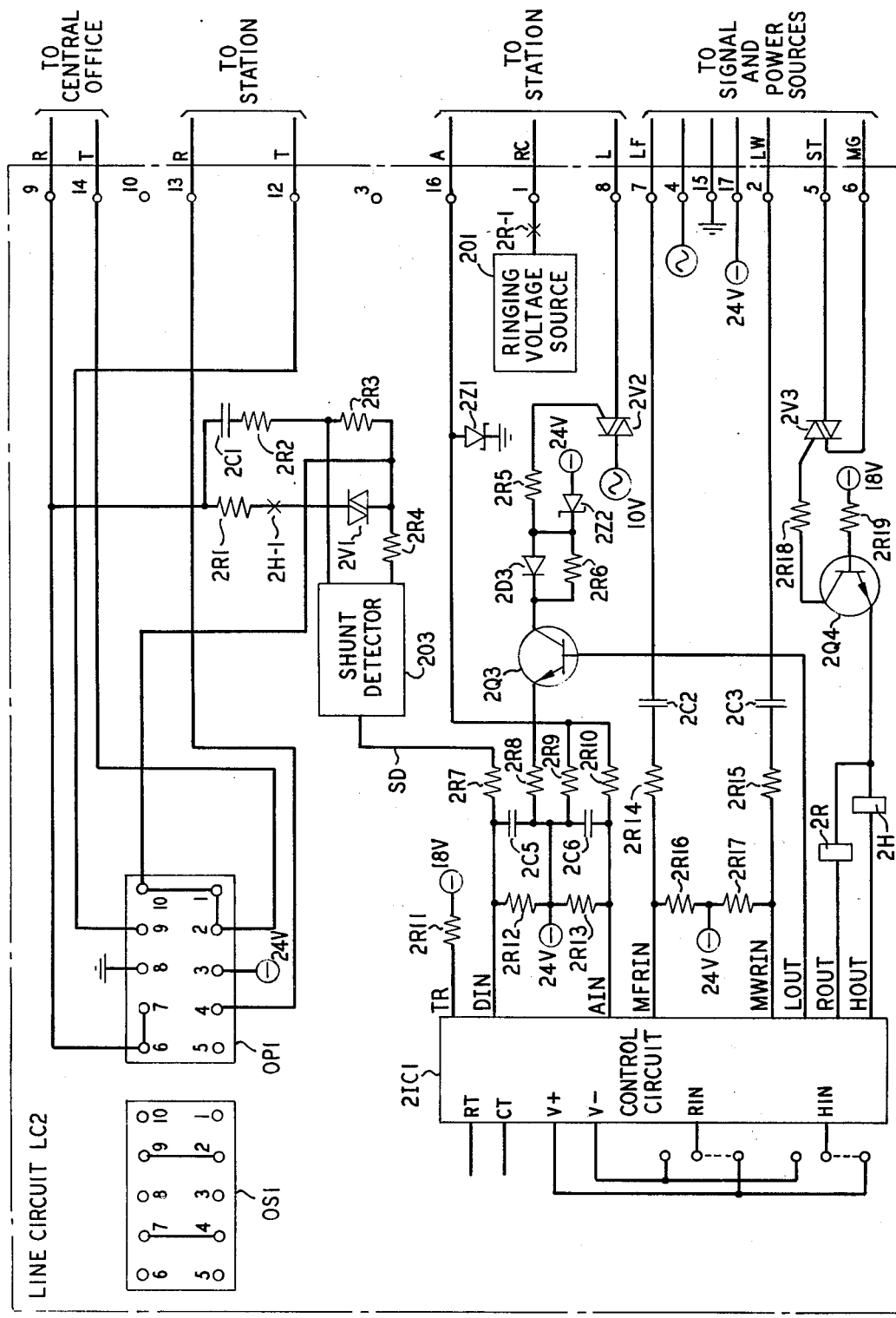
FIG. 2 shows a portion of a key telephone line circuit.

Turning now to FIG. 2, a key telephone line circuit LC2 is shown and it is the same line circuit detailed in U.S. Patent application filed in the name of R. J. Angner et al, Ser. No. 708,858 on July 28, 1976, which patent application is hereby incorporated by reference. As shown in FIG. 2, the tip and ring leads from the central office, as well as the tip and ring leads from the station are extended to option plugs OP1 and terminate thereon. In situations where a protective coupler is not necessary, option socket OS1 is arranged to mate with option plug OP1.

Figure 3:
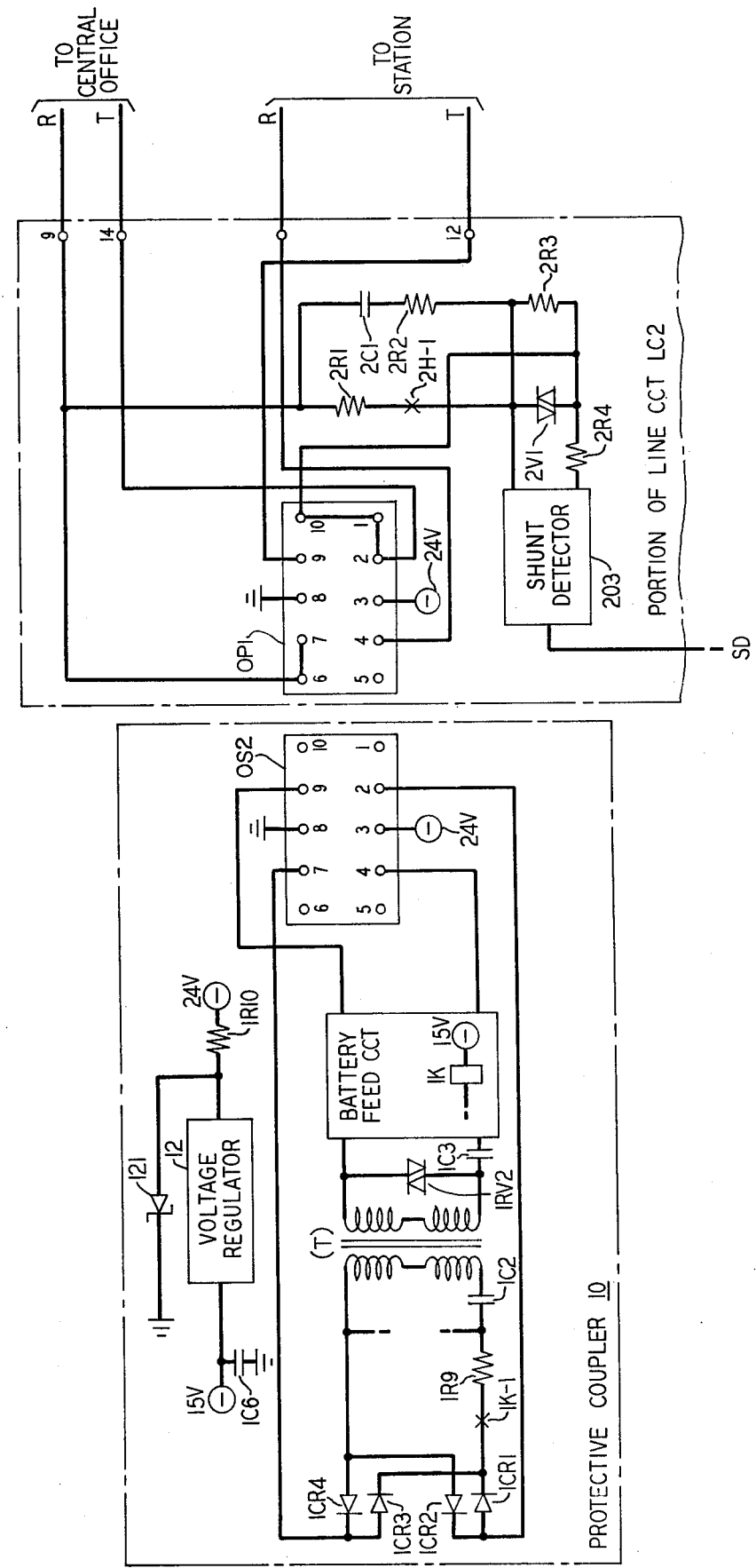
FIG. 3 shows a key telephone line circuit in conjunction with the protective coupler.

As shown in FIG. 3, when a protective coupler is required, option socket OS1 is removed and protective coupler 10 is plugged into option plug OP1 via its own option socket OS2. When a protective coupler is connected to option plug OP1 it becomes inserted in the communication connection between the central office and the associated station and communication signals between the central office and the station must pass through the protective coupler.

Figure 4:
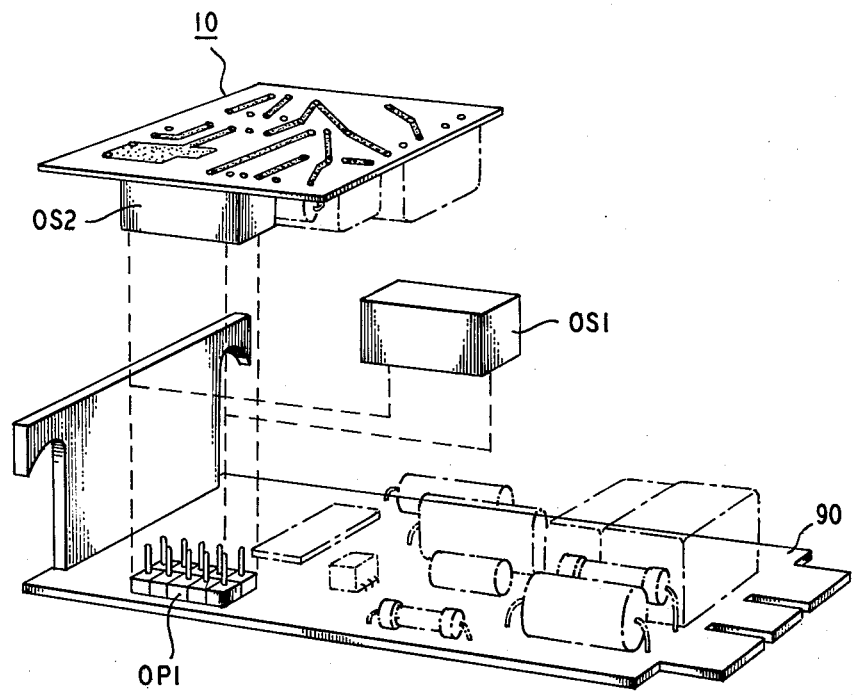
FIG. 4 shows, in pictorial format, the layout of a typical key telephone unit and protective coupler plug-in board.
Figure 5:
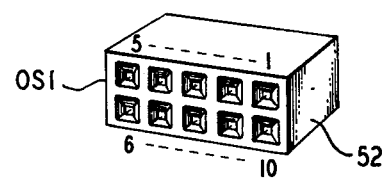
FIG. 5 shows an option socket.

In FIG. 4 a typical key telephone unit 90 is shown as a plug-in board having mounted thereon option plug OP1. Protective coupler 10 is shown with option socket OS2 for mating with option plug OP1. Option socket OS1 is shown at FIG. 5 and is arranged to mate, as discussed above, with option plug OP1 when a protective coupler is not used.

As shown in FIG. 1 current sink 13 consists of op-amp IC1 and is configured to be a unity gain op-amp circuit. A dc reference is established on the positive input of the op-amp by resistors 1R2 and 1R3. This reference is also applied across 1R4 due to the unity gain characteristics of the op-amp. This voltage across resistor 1R4 results in a current flow from the central office through op-amp IC1 and resistor 1R4. This current is of the same order as that which flows through a telephone when it is directly connected to the central office.

Capacitor 1C1 is placed across resistor 1R3 to provide filtering of ac signals so that the current through op-amp IC1 and resistor 1R4 is not attenuated by speech.

Of course it is to be understood that the arrangements described in the foregoing are merely illustrative of the application of the principles of the present invention. Numerous and varied other arrangements may be utilized by those skilled in the art without departing from the spirit and scope of the invention.

What is claimed is:

1. A protective coupler circuit for use in a telephone system between the communication leads from a central office and a terminal set, said terminal set operable for varying its signal gain dependent upon the battery potential supplied thereto, said protective coupler comprising, a first stage connectable to said central office communication leads and a second stage connectable to said terminal set, a signal frequency transformer interconnecting said stages and having a first set of windings connected to said first stage and a second set of windings connected to said second stage, said windings defining a protective barrier between said stages, a battery feed circuit connected to said second stage, said battery feed circuit operable for detecting an off-hook condition of said terminal set, for providing battery potential to operate said terminal set, during detected off-hook conditions, and for providing a control signal during said off-hook conditions, said battery potential being of a magnitude to encourage said terminal set to maximally increase said gain, a current sink circuit connected to said first stage, said current sink circuit operable under control of off-hook control signals provided from said battery feed circuit for passing current between said communication leads extended from said central office, said current operable as an indication that the associated station is off-hook, and means connected to said first stage for monitoring the DC loop voltage extended from said central office when said current sink is activated for adjusting the gain of signal frequencies passing across said protective barrier in accordance with said monitored DC loop voltage.

2. The invention of claim 1 wherein said protective coupler is arranged to mate with a key telephone line circuit having an option connector and wherein said protective coupler is mounted on a self-contained board having a connector adapted to electrically mate with said key telephone line circuit option connector.

3. The invention set forth in claim 1 wherein said battery feed signal includes the operation of a relay, one contact of which is connected in series with the communication leads on said first stage of said protective coupler, said relay operable in response to current flow from said station for repeating dial pulse signals from said terminal set to said telephone line.

4. The invention set forth in claim 1 wherein a capacitor is connected in series with the second set of windings and wherein said signal frequency transformer is constructed to saturate such that when used in combination with said capacitor dc signals as well as power line frequency signals do not pass through said transformer.

5. A protective coupler circuit adapted to mate with a key telephone line circuit to prevent hazardous voltages from being extended from a terminal set over the communication leads to the to the central office, said line circuit being equipped with an option connector, said protective coupler comprising, a first stage connectable to said central office communication leads from said key telephone line circuit and a second stage connectable to said terminal set, a signal frequency transformer interconnecting said stages and having a first set of windings connected to said first stage and a second set of windings connected to said second stage, a battery feed circuit connected to said second stage, said battery feed circuit operable for detecting an off-hook condition of said terminal set, for providing battery potential to operate said terminal set, during detected off-hook conditions, and for providing a control signal during said off-hook conditions, a current sink circuit connected to said first stage, said current sink circuit operable under control of off-hook control signals provided from said battery feed circuit for passing current between said communication leads extended from said central office, said current operable as an indication that the associated station is off-hook, means connected to said first stage for monitoring the voltage extended from said central office line when said current sink is activated for adjusting the gain of signal frequencies passing across said transformer barrier in accordance with said monitored voltage, said protective coupler being mounted on a self-contained board having a connector adapted to electrically mate with said key telephone line circuit option connector said terminal set being equipped with a signal limiting circuit operable to adjust the signal output of said terminal set depending upon the voltage present on the communication leads, said protective coupler battery feed circuit including means for providing a minimum voltage so as to cause said terminal set to provide maximum signal output on said communication leads, said protective coupler voltage monitoring and adjusting means operable to reduce said signal output in response to dc voltage potentials on the communication leads from the central office.

* * * * *